United States Patent [19]

Karino et al.

[11] Patent Number: 5,343,017
[45] Date of Patent: Aug. 30, 1994

[54] ARC WELDER WITH TIMED CONTROL OF ARCING RECOVERY AND MEANS FOR REDUCING WEIGHT, SIZE, AND POWER LOSS IN THE WELDER

[75] Inventors: Kunio Karino, Suita; Toshikazu Fujiyoshi, Kawanishi; Kenzo Danjo, Kizu; Atsushi Kinoshita, Osaka; Haruo Moriguchi, Itami, all of Japan

[73] Assignee: Sansha Electric Manufacturing Co., Ltd., Osaka, Japan

[21] Appl. No.: 120,049

[22] Filed: Sep. 13, 1993

[30] Foreign Application Priority Data

Sep. 11, 1992 [JP] Japan .................. 4-269464

[51] Int. Cl.$^5$ ............................................. B23K 9/073
[52] U.S. Cl. ................... 219/130.4; 219/130.51
[58] Field of Search ........... 219/130.4, 130.51, 137 PS

[56] References Cited

U.S. PATENT DOCUMENTS 5,264,679 11/1993 Martin .................. 219/130.4

FOREIGN PATENT DOCUMENTS 3-180276 8/1991 Japan .................. 219/130.4
3-41891 9/1991 Japan .

Primary Examiner—Clifford C. Shaw
Attorney, Agent, or Firm—Wegner, Cantor, Mueller & Player

[57] ABSTRACT

An arc welder provided with a low frequency square waveform a.c. power supply as a main power supply for welding in order to improve its power of recovering an arc which may go out at the time of polarity transition of a welding load and an auxiliary d.c. power supply for super-posing its output upon the input of the main power supply to further improve the recovering power, in which a switching element is inserted in a supply path of the output of the auxiliary d.c. power supply and the switching element is put in conduction by a suitable control device only for a necessary shortest arc recovery time in order to reduce a power loss due to continuous supply of the auxiliary d.c. output. The welder may include a diode which is put in conduction in response to an excessive transient voltage induced at the input of an invertor of the main power supply at the time of polarity transition of the welding load and, in order to prevent excessive charge of the capacitor in this case, the conduction time of the switching element may be extended to discharge an excess charge through the switching element to the invertor when a voltage across the capacitor exceeds a predetermined value.

3 Claims, 3 Drawing Sheets

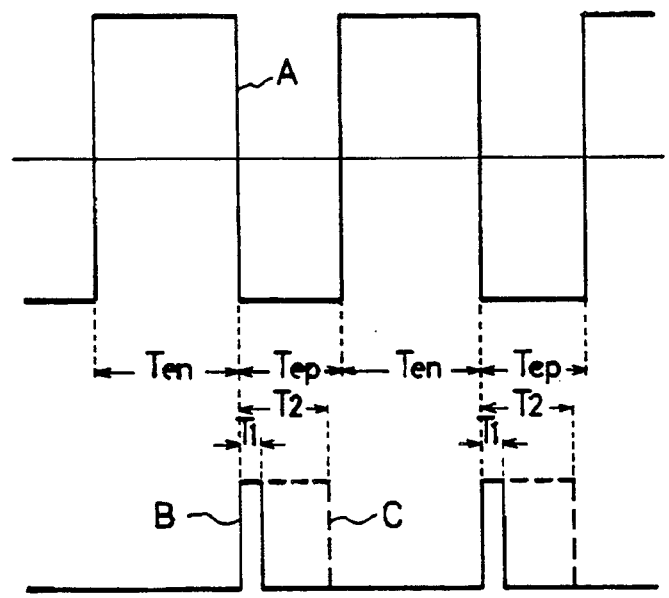
F I G. 2

ARC WELDER WITH TIMED CONTROL OF ARCING RECOVERY AND MEANS FOR REDUCING WEIGHT, SIZE, AND POWER LOSS IN THE WELDER

BACKGROUND OF THE INVENTION

This invention relates to an arc welder used for a.c. arc welding.

Generally, in a.c. arc welding, a current flowing through a welding load alternates its polarity and undergoes its zero value every half of its alternating period, thereby interrupting an arcing state. Therefore, it is necessary to recover the arcing state every such time. When a base material forming the welding load between a welding electrode is a metal such as aluminium, which is easily oxidized, and an a.c. current of a sine waveform is supplied to the welding load an oxide film on the surface of the base material is removed by cleaning phenomena during a half period for which the base material is negative and the electrode is positive, but it becomes difficult to recover the arcing state since electron emission is retarded by lacking energy directly after polarity transition. In a prior art arc welder used for arc welding of this kind, therefore, its arcing recovery power has been improved by converting the sine waveform of the welding current into a square waveform.

Such arc welder of square waveform type is disclosed, for example, in the Japanese utility model publication gazette No. H3(91)-41891. In this welder, as shown in FIG. 1, a commercial three-phase a.c. power supplied to power input terminals 1a, 1b and 1c is rectified and smoothed by a three-phase input rectifier 2 of diode-bridge configuration and a smoothing capacitor 3 and then applied to a high frequency a.c. convertor device 4. The device 4 is composed of a full bridge invertor including switching elements such as insulated-gate bipolar transistors (hereinunder referred to as "IGBTs") and field-effect transistors (hereinunder referred to as "FETs") and controlled by a high frequency invertor control device 5 to convert the input d.c. current into a high frequency a.c. current. The high frequency a.c. output of the device 4 is supplied to a primary winding 6a of a main transformer 6 and the high frequency a.c. output of its secondary winding 6b is rectified by a main rectifier 7 of diode-bridge configuration. The d.c. output of the rectifier 7 across its positive and negative output terminals 7p and 7n is smoothed by a d.c. reactor 8 and supplied to a low frequency a.c. convertor device 9. The device 9 is composed of a full-bridge invertor including switching elements 10, 11, 12 and 13 such as IGBTs or FETs and controlled by a low frequency invertor control device 14 to convert the input d.c. current into a low frequency square waveform a.c. current of ten to several hundred Hertz which is then supplied through output terminals 9a and 9b to an electrode 20 and a base material 21 which form a welding load 19 therebetween. The switching elements 10, 11, 12 and 13 are provided with back-current preventing diodes 15, 16, 17 and 18 respectively connected in parallel thereto.

In FIG. 2, A denotes a waveform of the output current flowing through the welding load 19. As shown, the welding current in this case is an alternating current having a square waveform, which has a large energy at the time of polarity transition and improves the arcing recovery power. In the drawing, $T_{en}$ denotes a normal polarity period for which the base material 21 is positive and the electrode 20 is negative and $T_{ep}$ denotes an inverse polarity period for which the base material 21 is negative and the electrode 20 is positive. However, in this case also, when the welding current is below 50 amperes, recovery of the arcing state is liable to become difficult especially at the time of normal-to-inverse polarity transition, since the energy stored in the d.c. reactor is insufficient.

In order to compensate for this shortcoming, the device of FIG. 1 is provided with an auxiliary d.c. power supply 22 used for arcing recovery voltage superposition as shown. The d.c. power supply 22 includes a boosting tertiary winding 6c of the main transformer 6, an auxiliary rectifier 24 and a capacitor 25 and an a.c. output of the tertiary winding 6c of the main transformer 6 is rectified and smoothed by the rectifier 24 and the capacitor 25 to produce an auxiliary arcing recovery voltage which is higher than the main d.c. voltage. The auxiliary voltage is supplied through a current limiting resistor 26 to the input of the low frequency a.c. convertor device 9 and superposed upon the main d.c. voltage. The auxiliary voltage serves to raise a no-load voltage at the time of polarity transition of the welding load 19 and facilitates recovery of the arcing state to remove the above-mentioned shortcoming.

A diode 27 connected in parallel to the current limiting resistor 26 is used for absorbing a transient voltage and serves to prevent transient rise of the input voltage of the low frequency a.c. convertor device 9. More particularly, when a cable for connecting the output terminals 9a and 9b of the device 9 to the welding load 19 is substantially long and its inductance is not negligible, an excessive transient voltage due to this inductance is liable to occur at the input of the device 9 at the instant of polarity transition of the welding load 19 based upon the switching operation of the switching elements 10 to 13. At this time, however, the diode 27 conducts to have the capacitor 25 absorb the transient voltage, thereby suppressing the voltage rise at the input of the device 9.

In the above-mentioned prior art arc welder, the auxiliary d.c. power supply 22 is always connected through the current limiting resistor 26 to the input of the low frequency a.c. convertor device 9. On the other hand, it has been confirmed experimentally that the no-load voltage between the welding electrode 20 and the base material 21 must be 200 volts at least for recovering the arcing state and it must be 250 volts for assuring stable arcing recovery power. Since the d.c. current in the current limiting resistor 26 is five amperes and the arcing voltage between the electrode 20 and the base material 21 is twenty volts in a general welding condition, a power loss in the current limiting resistor 26 reaches $(250-20) \times 5 = 1150$ watts if the no-load voltage is preset to 250 volts. Therefore, the current limiting resistor 26 must be of large capacity and large size and the transformer 6 and the rectifier 24 must have a constitution of large capacity and size, too. Accordingly, it retards the plan of size and weight reduction of the arc welder.

Accordingly, an object of this invention is to provide an arc welder which can be reduced in both size and weight by reducing the power loss at the time of superposition of the auxiliary arcing recovery voltage from the auxiliary power supply with the main voltage, while maintaining its high arcing recovery power.

Another object of this invention is to absorb the excessive transient voltage occurring in the low frequency a.c. convertor device into the auxiliary d.c. power supply and also suppress the auxiliary voltage rise following this absorption.

SUMMARY OF THE INVENTION

In order to achieve the above-mentioned objects, there is provided an arc welder which comprises, as same as the above-mentioned prior art device, main and auxiliary rectifiers for rectifying an a.c. supply voltage, a d.c. reactor for smoothing the output of the main rectifier to produce a main d.c. voltage, a low frequency a.c. convertor device for converting the main d.c. voltage into a low frequency square waveform a.c. voltage to supply it to a welding load, and an auxiliary d.c. power supply device including a capacitor for smoothing the output of the auxiliary rectifier and producing an auxiliary d.c. voltage which is higher than the main d.c. voltage. As a feature of this invention, however, it further comprises a switching device inserted between the auxiliary d.c. power supply device and the low frequency a.c. convertor device, which conducts only for a predetermined arcing recovery time which is shorter than the inverse polarity period of the welding load to superpose the auxiliary d.c. voltage upon the main d.c. voltage through a current limiting resistor when the load turns from the normal polarity to the inverse polarity.

According to another feature of this invention, the arc welder may further comprise a diode connected in parallel to the series connection of the current limiting resistor and the switching device for responding to an excessive transient voltage produced at the input of the low frequency a.c. convertor device to conduct at the time of polarity transition of the welding load, for having the capacitor of the auxiliary power supply device absorb the transient voltage, and a conduction control device for changing the conduction time of the switching device longer than the arcing recovery time to discharge the electric charge of the capacitor to the low frequency a.c. convertor device when the output voltage of the auxiliary power supply device rises up to a predetermined value due to absorption of the transient voltage.

Now, the above and other features and operation of this invention will be described in more detail below in connection with some embodiment thereof with reference to the accompanying drawings.

BRIEF DESCRIPTION OF THE DRAWINGS

In the drawings:

FIG. 2 is a diagram showing waveforms illustrative of an operation of the arc welder of this invention;

Throughout the drawings, same reference numerals are given to corresponding structural components.

DESCRIPTION OF PREFERRED EMBODIMENTS

Figure 1:
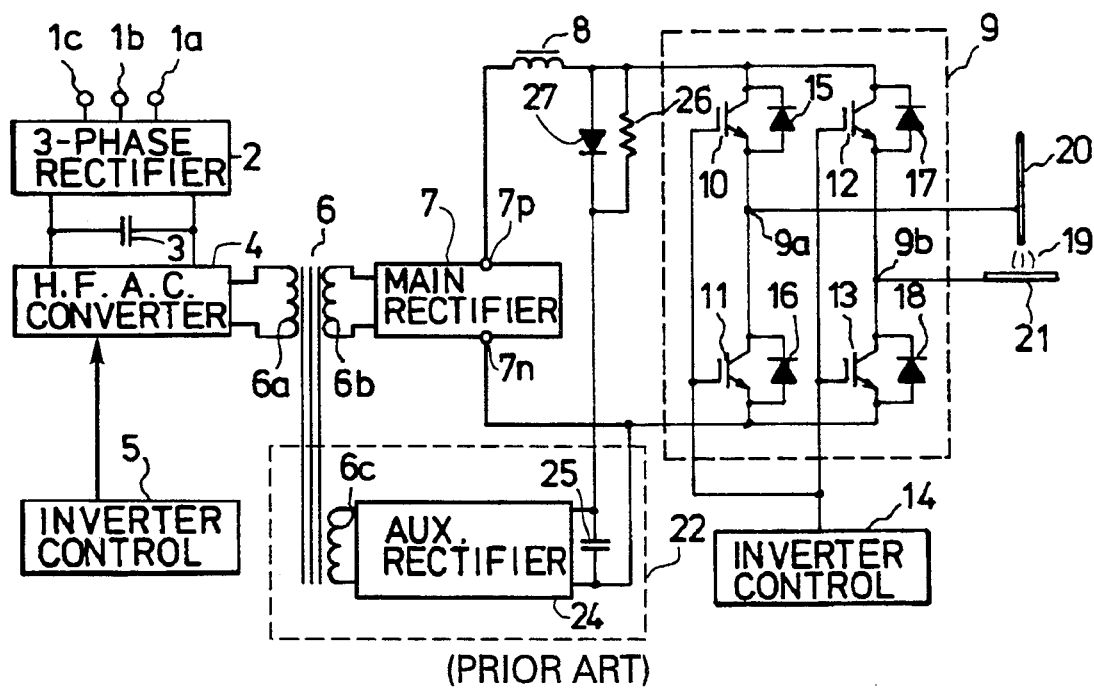
FIG. 1 is a diagram showing, partly in block form, a circuit configuration of the prior art arc welder.
Figure 3:
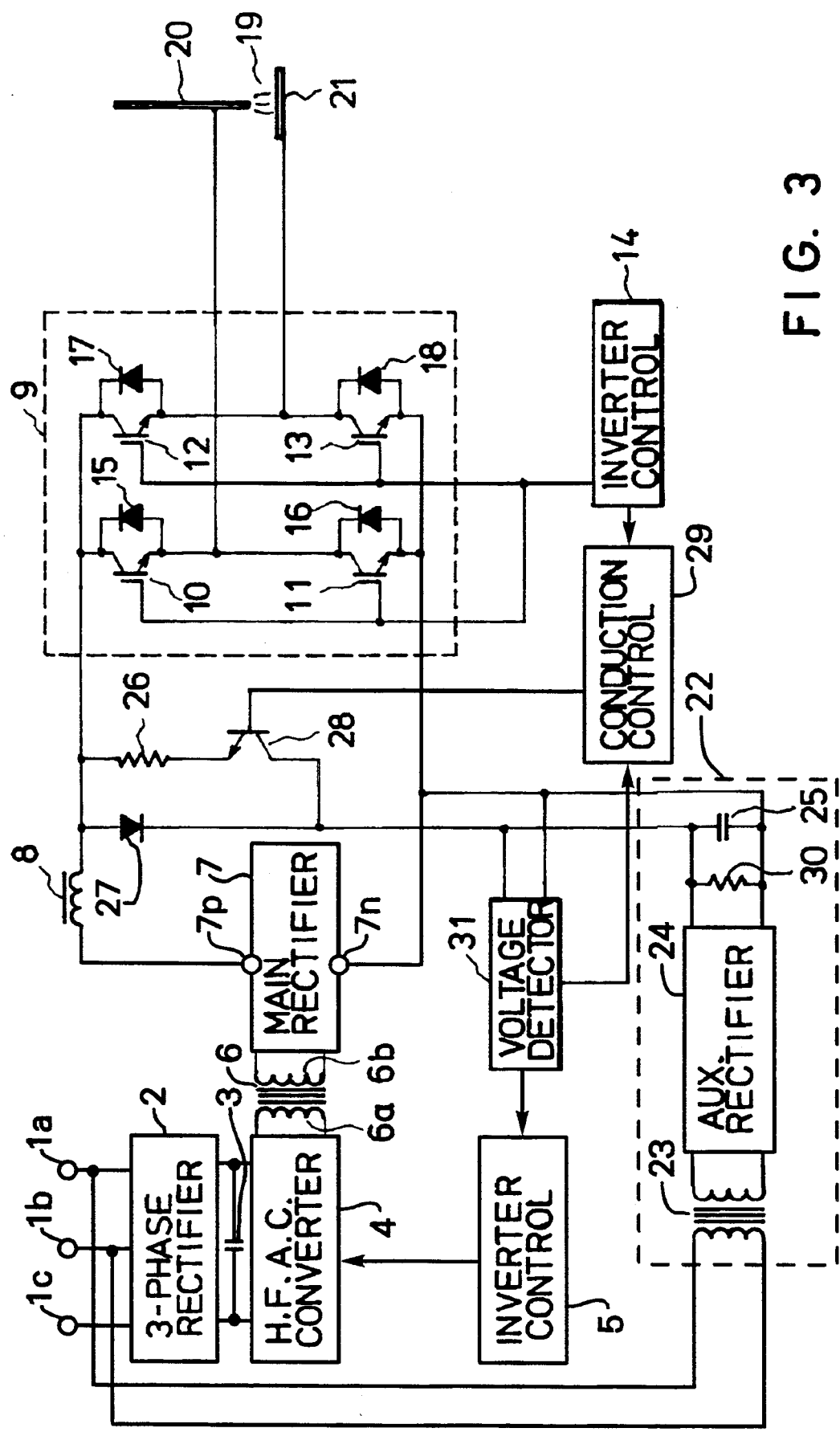
FIG. 3 is a diagram showing, partly in block form, an embodiment of the arc welder of this invention.

As in the prior art arc welder of FIG. 1, the embodiment of this invention as shown in FIG. 3 is provided with a main d.c. power supply device comprising a three-phase input rectifier 2 for rectifying an a.c. input of three-phase a.c. power supply terminals 1a, 1b and 1c, a capacitor 3 for smoothing the output of the rectifier 2, a high frequency a.c. convertor 4 of invertor configuration for converting a d.c. voltage across the capacitor 3 into a high frequency a.c. voltage, an invertor control device 5 for effecting switching control of the invertor of the convertor 4, a main transformer 6 for transforming an a.c. output of the convertor 4, a main rectifier 7 of diode-bridge configuration for rectifying the output of the main transformer 6 and a d.c. reactor 8 for smoothing the output of the main rectifier 7, and a low frequency a.c. convertor device 9 of invertor configuration driven by an invertor control device 14 for converting the output d.c. voltage of the main d.c. power supply device into a low frequency square waveform a.c. voltage.

While this arc welder is also provided with an auxiliary d.c. power supply device 22 similar to that of the welder of FIG. 1, the input of this power supply device 22 is not supplied from the tertiary winding of the transformer 6 but from a secondary winding of a separate auxiliary transformer 23 having a primary winding connected to the a.c. power supply terminals 1a and 1b.

As a feature of this invention, the embodiment of FIG. 3 is provided with a transistor 28 as a switching element having its collector-emitter path connected in series to a current limiting resistor 26, a conduction control device 29 connected to the base electrode of the transistor 28 for controlling conduction thereof, a discharging resistor 30 connected in parallel to the capacitor 25 at the output of the auxiliary rectifier 24 and a voltage detector 31 for monitoring the output voltage of the auxiliary d c power supply 22 across the capacitor 25.

The conduction control device 29 produces a control signal as shown by a waveform B in FIG. 2 based upon the drive signal of the invertor control device 14 and puts the transistor 28 into conduction only for a predetermined arcing recovery time $T_1$ which is shorter than the inverse polarity period $T_{ep}$ at the time of transition from the normal polarity period $T_{en}$ where the switching elements 11 and 12 conduct to the inverse polarity period $T_{ep}$ where the switching elements 10 and 13 conduct. During this time, therefore, the auxiliary voltage of the auxiliary d.c. power supply 22 is applied through the transistor 28 and the current limiting resistor 26 to the low frequency a.c. convertor 9 and superposed upon the main d.c. voltage from the main rectifier 7. Thus, the application time of the auxiliary voltage is limited to the arcing recovery time $T_1$ and, therefore, the conduction time of the current limiting resistor 26 is significantly reduced as compared with the prior art device of FIG. 1. This reduction of the conduction time results in reduction of the loss in the resistor 26, transformer 23 and rectifier 24 and enables substantial reduction in the capacity and size of these components.

As described above, the excessive transient voltage induced at the input of the convertor 9 by the cable inductance when the cable to the welding load is long is absorbed by the capacitor 25 through the diode 27 and this absorption results in substantial increase of the voltage across the capacitor 25, that is, the auxiliary voltage. Although this increase of auxiliary voltage is advantageous for arcing recovery, it undesirably tends to request for excessively high breakdown voltage to the capacitor 25 and the switching elements 10 to 13 of the convertor 9. In the embodiment of FIG. 3, however, the capacitor voltage is discharged through the parallel resistor 30 to suppress the voltage increase of the capacitor 25.

In some time, however, the voltage across the capacitor 25 may gradually increase due to insufficient discharge through the discharging resistor 30. The voltage detector 31 monitors this voltage across the capacitor 25 and, if it exceeds a predetermined value $V_1$, sends a signal to the conduction control device 29. The conduction control device 29 responds to this signal to generate a control signal as shown by a dashed line C in FIG. 2 to extend the conduction time of the transistor 28 from $T_1$ to $T_2$. Accordingly, the charge in the capacitor 25 becomes to discharge much more to the convertor device 9 through the transistor 28 to result in gradual reduction of the voltage across the capacitor 25. When the voltage drops below the above-mentioned value $V_1$, the voltage detector 31 sends a signal to the conduction control device 29, so that the device 29 restores the control signal to the waveform B of FIG. 2.

When the voltage across the capacitor 25 does not stop to rise and its value exceeds another predetermined value $V_2$ which is higher than the predetermined value $V_1$ regardless of the above-mentioned extension of the conduction time of the transistor 28 from $T_1$ to $T_2$, the voltage detector 31 sends a stop signal to the invertor control device 5 to stop operation of the high frequency a.c. convertor device 4, thereby stopping the output of the welder.

Figure 4:
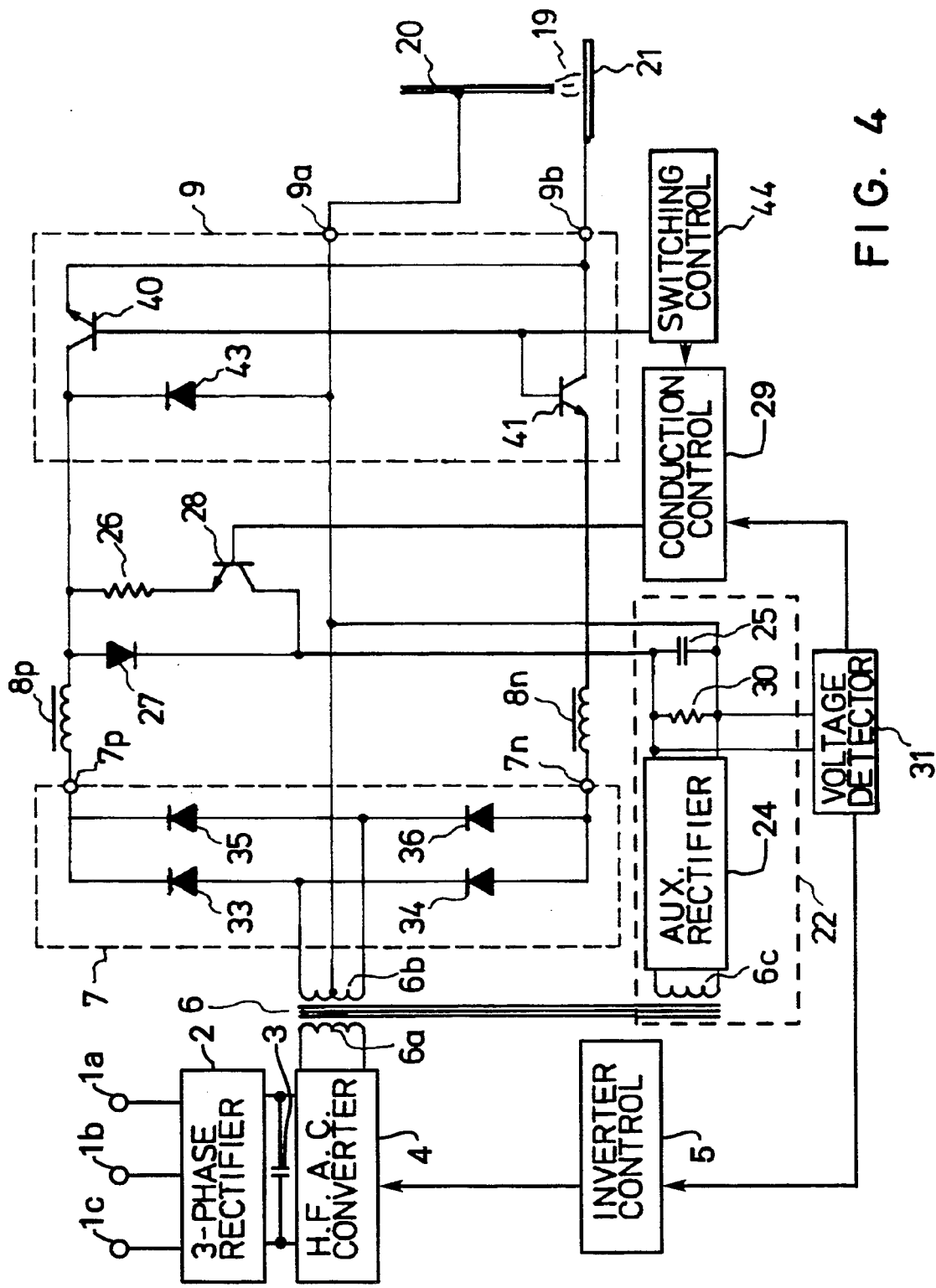
FIG. 4 is a diagram showing, partly in block form, another embodiment of the arc welder of this invention.

Next, the description will be made on another embodiment of the invention as shown in FIG. 4. In this embodiment, the secondary winding 6b of the transformer 6 has a center tap which is connected through an output terminal 9a of the welder to a welding electrode 20. The secondary voltage of the transformer 6 is applied to a half-wave rectifying bridge circuit of four diodes 33, 34, 35 and 36, which constitutes a main rectifier 7 and the positive and negative terminals 7p and 7n of the main rectifier 7 are connected respectively through smoothing d.c. reactors 8p and 8n and transistors 40 and 41 to another output terminal 9b of the welder which is connected to a base material 21. The transformer 6 has a boosting tertiary winding 6c as in the device of FIG. 1 and the auxiliary power supply device 22 includes an auxiliary rectifier 24, a smoothing capacitor 25 and a discharging resistor 30.

The transistors 40 and 41 constitute a low frequency a.c. convertor device 9 and their base electrodes are connected to a switching control device 44. The control device 44 sends a switching signal to the transistors 40 and 41 to alternately put them into conduction to produce a low frequency square waveform a.c. voltage as shown by waveform A in FIG. 2 between output terminals 9a and 9b.

As in the embodiment of FIG. 3, the auxiliary d.c. power supply device 22 is connected through a series connection of a current limiting resistor 26 and a transistor 28 to the convertor device 9, so that the auxiliary voltage is superposed upon the welding voltage at the time of conduction of the transistor 40. The switching control device 44 sends a signal to the conduction control device 29 at the time of commencement of conduction of the transistor 40 and the conduction control device 29 responds to the signal to put the transistor 28 into conduction. The conduction time of the transistor 28 is variably set in response to a signal sent from a voltage detector 31 for monitoring the voltage across the capacitor 25, as in the embodiment of FIG. 3. The voltage detector 31 also sends a stop signal to the invertor control device 5 to stop operation of the high frequency a.c. convertor device 4 in case of urgency.

A diode 43 inserted between the center tap of the transformer 6 and the collector of the transistor 40 is a so-called flywheel diode which serves to suppress a leading edge of cable inductance following the switching operation of the transistor 40.

The embodiment of FIG. 4 has fewer structural elements and simpler configuration of the convertor device 9 than the embodiment of FIG. 3 and, therefore, it has such an advantage in that it is not only small in size and low in price, but also it is capable of similar operation.

The above-mentioned embodiments are presented only for the purpose of illustration of the invention and do not mean any limitation of the invention. It should be obvious to those skilled in the art that various modifications and variations can be applied to these embodiments without leaving the spirit and scope of the invention as defined in the appended claims. For example, although the above embodiments use such a roundabout method in that three-phase commercial a.c. voltage is rectified, the resultant d.c. current is converted into high frequency a.c. voltage, the a.c. voltage is rectified again and then converted into low frequency a.c. voltage for welding, this is for the purpose of reducing the size and weight of the main transformer 6 and has no connection to this invention. In other words, any line voltage other than three-phase may be used directly as the input of the transformer 6, or the line voltage may be rectified directly by the main rectifier 7 and the output voltage of the convertor device 9 may be suitably transformed.

We claim:

1. In an arc welder having
    main d.c. power supply means for preparing a main d.c. voltage for welding,
    convertor means for converting said main d.c. voltage into a low frequency square waveform a.c. voltage to apply the same to a welding load, thereby forming normal and inverse polarity periods of application of said square waveform a.c. voltage said welding load, auxiliary power supply means for preparing an auxiliary d.c. voltage for arcing recovery, which auxiliary voltage is higher than said main d.c. voltage, said auxiliary d.c. power supply means having a smoothing capacitor, and
    arcing recovery promotion means for applying said auxiliary d.c. voltage to said convertor means in order to superpose the auxiliary d.c. voltage upon said main d.c. voltage, the improvement comprising:
    said arcing recovery promotion means having timing means for limiting application of said auxiliary d.c. voltage within a predetermined arcing recovery time period following each transition of polarity of said welding load from said normal to said inverse polarity periods, said arcing recovery time period being shorter than each of said inverse polarity periods, a diode means, operatively connected between said capacitor and an input of said convertor means, for conducting in response to an excessive transient voltage induced at an input of said convertor means at a time of each said transition of the polarity of said load in order to facilitate absorbing of said transient voltage by said capacitor, said timing means having means for detecting a voltage across said capacitor and producing a detection signal in response thereto, and means for changing a length of said arcing recovery time period in response to said detection signal.

2. The improvement as set forth in claim 1, and further comprising:

means for outputting a signal from said convertor means; and said timing means having a switching device controlled by said signal from said convertor means.

3. The improvement as set forth in claim 1, and further comprising:

means for stopping operation of said main d.c. power supply means when the voltage across said capacitor exceeds a predetermined value.

* * * * *